United States Patent [19]

Ishikawa et al.

[11] Patent Number: 4,642,044
[45] Date of Patent: Feb. 10, 1987

[54] LOCK

[75] Inventors: Yasushi Ishikawa; Takeshi Fukuroi, both of Yamanashi, Japan

[73] Assignee: Fanuc Ltd, Minamitsuru, Japan

[21] Appl. No.: 761,560

[22] PCT Filed: Nov. 20, 1984

[86] PCT No.: PCT/JP84/00555
§ 371 Date: Jul. 23, 1985
§ 102(e) Date: Jul. 23, 1985

[87] PCT Pub. No.: WO85/02363
PCT Pub. Date: Jun. 6, 1985

[51] Int. Cl.⁴ .............................................. B29C 45/66
[52] U.S. Cl. .................................. 425/593; 425/451.6

[58] Field of Search ............ 425/592, 593, 595, 451.5, 425/451.6, 451.9, DIG. 220, DIG. 222

[56] References Cited

U.S. PATENT DOCUMENTS

| | | | |
|---|---|---|---|
| 2,358,686 | 9/1944 | Caron | 425/451.6 |
| 2,498,264 | 2/1950 | Goldhard | 425/593 X |
| 3,345,691 | 10/1967 | Aoki | 425/451.6 X |
| 4,341,511 | 7/1982 | Lawrent et al. | 425/593 X |
| 4,360,335 | 11/1982 | West | 425/593 X |

Primary Examiner—Tim Miles
Attorney, Agent, or Firm—Staas & Halsey

[57] ABSTRACT

In a lock in an injection molding apparatus for causing a toggle mechanism to lock molds, a servo motor is used as a drive source for driving the toggle mechanism to perform and control locking.

3 Claims, 3 Drawing Figures

LOCK

TECHNICAL FIELD

The present invention relates to a toggle type lock in an injection molding apparatus.

BACKGROUND ART

A conventional toggle type lock in an injection molding apparatus is driven by a hydraulic mechanism. For this reason, a hydraulic pump, valves or the like complicate the construction of the conventional lock drive mechanism. The locking operation must be controlled by a hydraulic pressure. As a result, locking speed control is complex and cannot be easily performed.

SUMMARY OF THE INVENTION

It is an object of the present invention to eliminate the drawbacks of the prior art and to provide a toggle type lock whose locking operation can be easily controlled.

A lock in an injection molding apparatus for causing a toggle mechanism to perform locking according to the present invention, comprises a servo motor and a transmission mechanism having a screw and a nut mechanism for converting the rotational force of the servo motor to a linear force, the toggle mechanism being driven by an output from the transmission mechanism.

In this manner, according to the present invention, the servo motor is used as a drive source of the toggle mechanism for performing locking, so that locking speed control can be easily performed to obtain a desired locking speed. Furthermore, since a toggle mechanism is employed, a compact servo motor can be used, thus resulting in a simple structure and easy maintenance. When a locking force is controlled, a position sensor mounted on the servo motor precisely controls the positions of the screw and the toggle mechanism, thereby simplifying locking force control.

When molds are closed and continuously locked at a predetermined pressure, a link of the toggle mechanism is kept straight. The toggle mechanism itself is stably operated to hold the molds while the molds are locked. For this reason, not much power need be supplied to the servo motor. Only a small current need be supplied to the servo motor only for preventing the molds and the link of the toggle mechanism from being moved due to vibrations or the like, thereby decreasing energy consumption.

Unlike the conventional lock, a hydraulic mechanism is not used, so that operation reliability is improved. In the conventional lock, a hydraulic pump is operated with power to generate a hydraulic pressure used to drive the drive mechanism. In order to maintain a predetermined pressure, a large power loss occurs. However, according to the present invention, electric power is used only to drive the servo motor, and the drive mechanism is directly driven by the output from the servo motor. As a result, an energy loss can be decreased.

DETAILED DESCRIPTION OF THE PREFERRED EMBODIMENTS

The present invention will be described in detail with reference to the accompanying drawings.

Figure 1:
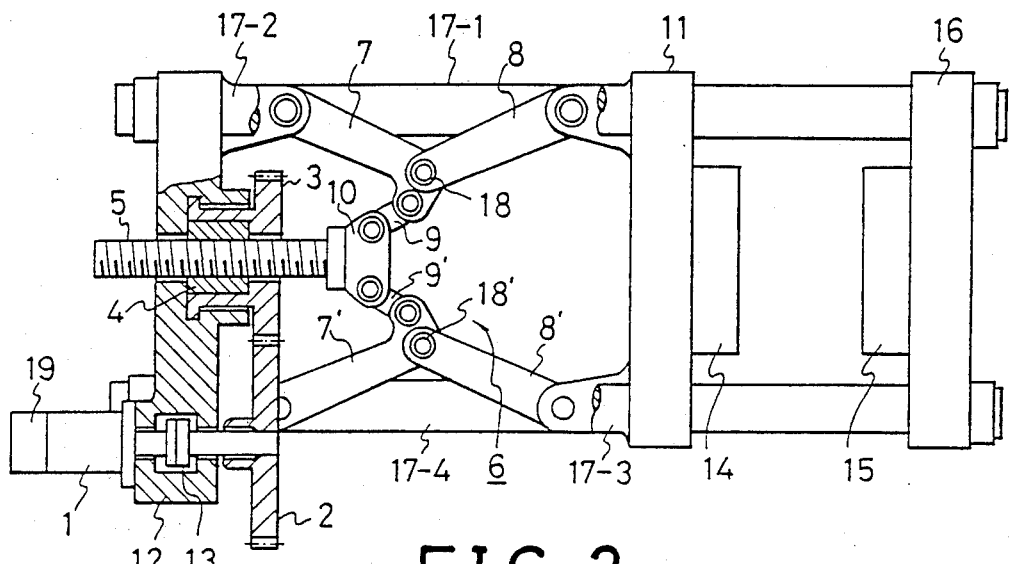
FIG. 1 shows a first embodiment of the present invention.

FIG. 1 shows a first embodiment of the present invention. Reference numeral 1 denotes a servo motor; 2 and 3, gears, respectively; 4, a nut fixed on the gear 3; and 5, a screw engaged with the nut 4. The gears 2 and 3, the nut 4, the screw 5 and the like constitute a transmission mechanism for transmitting power from the servo motor 1 to a toggle mechanism 6. The toggle mechanism 6 is of double toggle type. One end of each of links 9 and 9' is pivotally supported by a crosshead 10 mounted at a distal end of the screw 5. The other end of each of the links 9 and 9' is pivotally supported by a corresponding one of links 7 and 7'. Links 8 and 8' are pivotally supported by the links 7 and 7', respectively. The links 7 and 7' are pivotally supported by a fixed back pressure plate 12. The links 8 and 8' are pivotally supported by a movable base 11. The links 7 and 7', 8 and 8' and 9 and 9' and the crosshead 10 constitute the toggle mechanism 6. Reference numerals 14 and 15 denote molds, respectively. The molds 14 and 15 are fixed on the movable base 11 and a fixed base 16. The fixed base 16 and the fixed back pressure plate 12 are connected by four tie bars 17-1 to 17-4. The movable base 11 can be moved by the toggle mechanism 6 between the tie bars 17-1 to 17-4 along the right-and-left direction of FIG. 1. Reference numeral 13 denotes a coupling device for transmitting the output from the servo motor 1 to the gear 2. Reference numeral 19 denotes a position sensor mounted on the servo motor 1.

In operation, when the servo motor 1 is rotated, the gear 2 is rotated through the coupling device 13. The gear 3 meshed with the gear 2 and then the nut 4 fixed to the gear 3 are rotated. When the nut 4 is rotated, the screw 5 meshed with the nut 4 is pushed upon pivotal movement of the nut 4. The screw 5 is shifted to the right in FIG. 1. In this manner, the rotational force of the servo motor 1 is converted to a linear force of the screw 5. When the screw 5 is gradually moved to the right in FIG. 1, the crosshead 10 fixed to the distal end of the screw 5 vertically (FIG. 1) separates a joint 18 between the links 7 and 8 from a joint 18' between the links 7' and 8' through the links 9 and 9'. The movable base 11 and the mold 14 fixed on the movable base 11 are shifted to the right in FIG. 1. The molds 14 and 15 are closed immediately before the links 7 and 8 and the links 7' and 8' become straight. When the links 7 and 8 and the links 7' and 8' become straight, the servo motor 1 is stopped. The tie bars 17-1 to 17-4 are kept taut to a degree that the links 7 and 8 and the links 7' and 8' are kept completely straight. The molds 14 and 15 are clamped by an elastic restoration force generated by extension of the tie bars 17-1 to 17-4. When the molds 14 and 15 are opened, the servo motor 1 is rotated in the reverse direction to shift the screw 5 to the left in FIG. 1, thereby obtaining the state of FIG. 1.

During locking of the molds as described above, the molds 14 and 15 are locked when the links 7, 8, 7' and 8' in the toggle mechanism 6 become straight. The toggle mechanism 6 itself is kept stable. The toggle mechanism 6 holds the molds while locking them, so that a reaction force of the locking force does not substantially act on the screw 5. For this reason, not much power need be supplied to the servo motor 1. Only a small current for preventing the mold 14 and the links 7, 8, 7' and 8' of the toggle mechanism 6 from being shifted by vibrations or the like need be supplied to the servo motor 1. Furthermore, when the servo motor 1 is stopped before the links 7, 8, 7' and 8' in the toggle mechanism 6 become completely straight, thereby controlling the locking force of the molds 14 and 15, a very small reaction force acts on the screw 5. Such a force can be absorbed by friction in the transmission device of gears 2 and 3 or the like and will not be substantially transmitted to the servo motor 1. When a servo motor with a brake mechanism is used as needed, the molds can be further held at the predetermined position, and a predetermined locking force can also be obtained.

Figure 2:
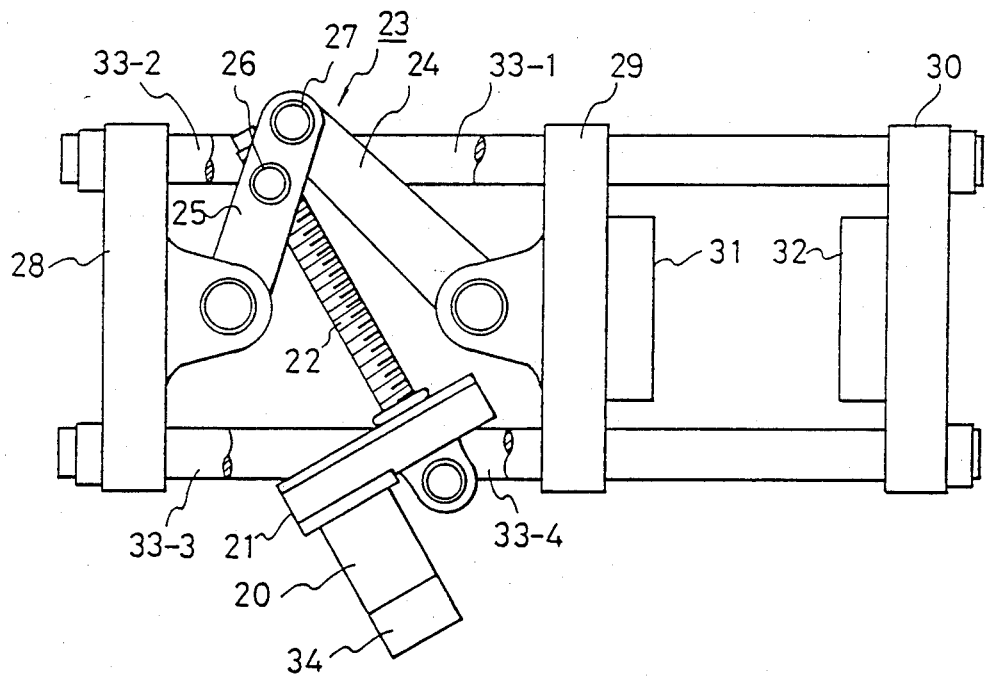
FIG. 2 shows a second embodiment of the present invention.
Figure 3:
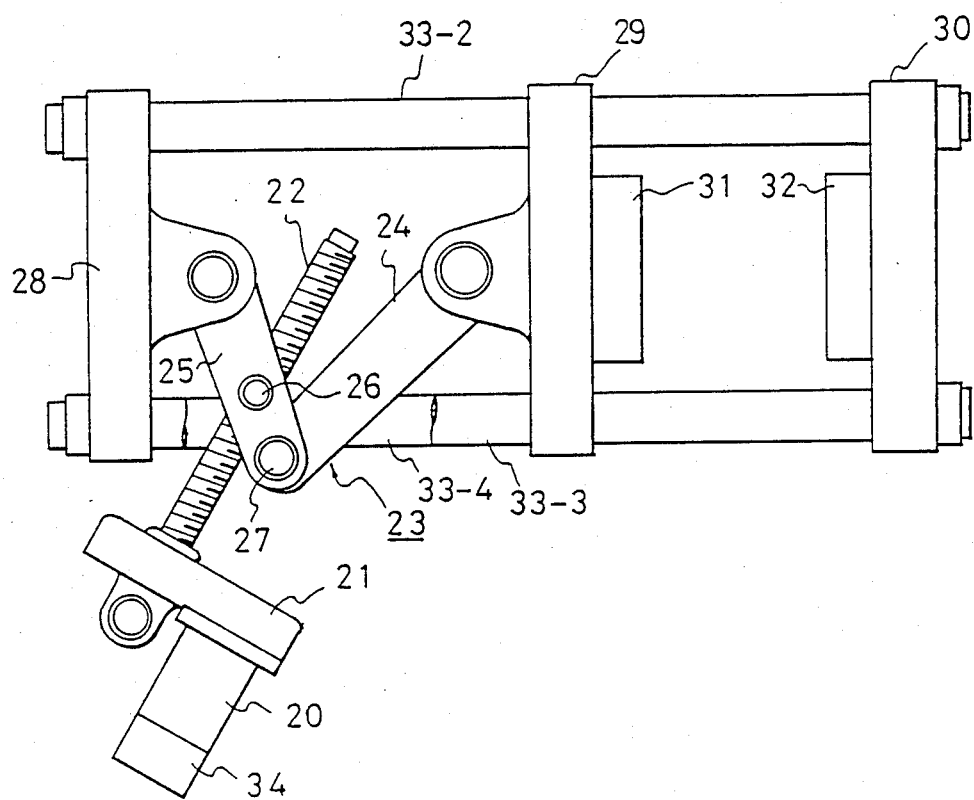
FIG. 3 shows a third embodiment of the present invention.

FIGS. 2 and 3 show other embodiments using single toggle mechanisms, respectively. Reference numeral 20 denotes a servo motor; 21, a gear box; 22, a screw; 23, a toggle mechanism; 24 and 25, links in the toggle mechanism 23; and 26, a nut pivotally mounted on the link 25. The nut 26 is meshed with the screw 22. Reference numeral 27 denotes a joint between the links 24 and 26; 28, a fixed back pressure plate; 29, a movable base; 30, a fixed base; 31 and 32, molds, respectively; 33-1 to 33-4, tie bars, respectively; and 34, a position sensor.

Describing the operation of the embodiment shown in FIG. 2, when the servo motor 20 is rotated, the screw 22 is rotated through the gear in the gear box 21. The nut 26 meshed with the screw 22 is moved along the screw 22 downward in FIG. 2. As a result, the links 25 and 24 in the toggle mechanism 23 are held straight to shift the movable base 29 and the mold 31 to right in FIG. 2, thereby closing and locking the molds 31 and 32. This operation is the same as that in the first embodiment of FIG. 1.

The embodiment of FIG. 3 is substantially the same as that of FIG. 2, except that the nut 26 is pushed while the nut 26 is pulled toward the servo motor 20 upon rotation of the screw 22 in the second embodiment.

We claim:

1. A lock in an injection molding apparatus, having a fixed back pressure plate connected to one end of a plurality of tie bars extending in parallel with each other, a movable base slidably supported by said tie bars and adapted to receive a first mold, and a double toggle type toggle mechanism having at least one pair of link means each of which is pivotally connected between said fixed back pressure plate and said movable base for moving between extended and retracted positions, said lock being arranged to move said movable base with respect to a fixed base to which a second mold is fixed, until said link means becomes straight, so that the first and second molds are clamped by an elastic restoration force generated by extension of said tie bars, the improvement comprising:

(a) a servo motor; and
(b) a transmission mechanism having a nut mechanism rotatably supported by said fixed back pressure plate and a screw threadedly engaged with said nut mechanism and extending substantially in parallel with said tie bars, wherein said nut mechanism is adapted to be rotatively driven by said servo motor for rotatively driving said screw, said screw is adapted to be rotatively driven for reciprocal movement substantially in parallel with said tie bars to extend and retract said link means, and said servo motor operates to hold said link means straight when said link means is straightened.

2. A lock according to claim 1, wherein said servo motor is supplied with a very small electric current to hold said link means straight when said link means is straightened.

3. A lock according to claim 1, wherein said servo motor comprises a brake mechanism adapted to hold said link means straight when said link means is straightened.

* * * * *